(12) United States Patent
Shah et al.

(10) Patent No.: US 9,183,862 B1
(45) Date of Patent: Nov. 10, 2015

(54) LOAD/UNLOAD RAMPS FOR MULTIPLE DISK-STACK, SHARED ACTUATOR HARD DISK DRIVE

(71) Applicant: HGST Netherlands B.V., Amsterdam (NL)

(72) Inventors: Anant Shah, Fremont, CA (US); Thomas Tamayo, Santa Clara, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/548,232

(22) Filed: Nov. 19, 2014

(51) Int. Cl.
G11B 5/54 (2006.01)

(52) U.S. Cl.
CPC .......................................... G11B 5/54 (2013.01)

(58) Field of Classification Search
CPC ............. G11B 5/54; G11B 5/60; G11B 17/00
USPC ....................... 360/254.7, 254.1, 254.8, 254.9
See application file for complete search history.

(56) References Cited

U.S. PATENT DOCUMENTS

| | | | |
|---|---|---|---|
| 3,864,747 A | 2/1975 | Pejcha | |
| 4,019,205 A * | 4/1977 | Salmond et al. | 360/98.06 |
| 5,172,282 A * | 12/1992 | Ghose | 360/78.12 |
| 6,115,215 A * | 9/2000 | Adams et al. | 360/264.4 |
| 6,134,076 A | 10/2000 | Boutaghou et al. | |
| 6,414,821 B1 * | 7/2002 | Tokuyama et al. | 360/254.8 |
| 6,437,945 B1 | 8/2002 | Hawwa et al. | |
| 6,628,469 B1 * | 9/2003 | Hoyt | 360/69 |
| 6,693,773 B1 * | 2/2004 | Sassine | 360/254.9 |
| 7,746,599 B2 | 6/2010 | Kim et al. | |
| 7,848,057 B1 * | 12/2010 | Shukla | 360/254.3 |
| 8,028,311 B2 * | 9/2011 | Gilovich | 720/699 |
| 8,958,172 B1 * | 2/2015 | Hansen | 360/98.01 |
| 2001/0033459 A1 * | 10/2001 | Boutaghou | 360/254.3 |
| 2003/0002221 A1 * | 1/2003 | Mayne | 360/254.7 |
| 2004/0075932 A1 * | 4/2004 | Watson | 360/69 |
| 2005/0240953 A1 * | 10/2005 | Awano | 720/670 |
| 2006/0044663 A1 * | 3/2006 | Stiles et al. | 360/69 |

(Continued)

FOREIGN PATENT DOCUMENTS

| | | |
|---|---|---|
| EP | 0671741 A2 | 9/1995 |
| EP | 0895237 A1 | 2/1999 |

OTHER PUBLICATIONS

Seiichi Sugaya, "Trends in Enterprise Hard Disk Drives", FUJITSU Sci. Tech. J., Jan. 2006, pp. 61-71, vol. 42, Issue 1.

(Continued)

*Primary Examiner* — Allen T Cao
(74) *Attorney, Agent, or Firm* — John D. Henkhaus

(57) ABSTRACT

A load/unload ramp configured for a multiple disk-stack, shared actuator hard disk drive (HDD) includes two ramp parts configured to swivel-engage together. Each of the two ramp parts may have a sleeve configured for positioning over a swivel pin and a locking pin configured for positioning and movement within a corresponding receptacle constituent to an HDD base. Thus, each ramp part can be positioned to a respective initial locking position onto the base, a first disk stack installed, a first ramp part swiveled to a final locking position engaged with the first disk stack, and fixed to the base. Then an actuator assembly can be inserted and the corresponding actuator arms parked onto the first ramp part, a second disk stack installed, then the second ramp part swiveled to its final locking position engaged with the second disk stack, and fixed to the base.

15 Claims, 16 Drawing Sheets

(56) References Cited

U.S. PATENT DOCUMENTS

| | | | |
|---|---|---|---|
| 2006/0044668 A1* | 3/2006 | Cho | 360/75 |
| 2007/0008653 A1* | 1/2007 | Ohno et al. | 360/254.3 |
| 2008/0094757 A1* | 4/2008 | Duvall et al. | 360/254.7 |
| 2008/0316875 A1* | 12/2008 | Chan | 369/44.11 |
| 2009/0067086 A1* | 3/2009 | Kaneko et al. | 360/98.01 |
| 2011/0122528 A1* | 5/2011 | Burness | 360/98.07 |

OTHER PUBLICATIONS

"Toshiba rises above competition with world's lightest notebook PC", downloaded from: https://www.toshiba.eu/innovation/jsp/news.do?service=EU&year=NONE&ID=PORTEGE_R500_NEWS_RELEASE_0 607 on May 28, 2014.

Ulrich G. Hansen; U.S. Appl. No. 14/056,846, filed Oct. 17, 2013.

* cited by examiner

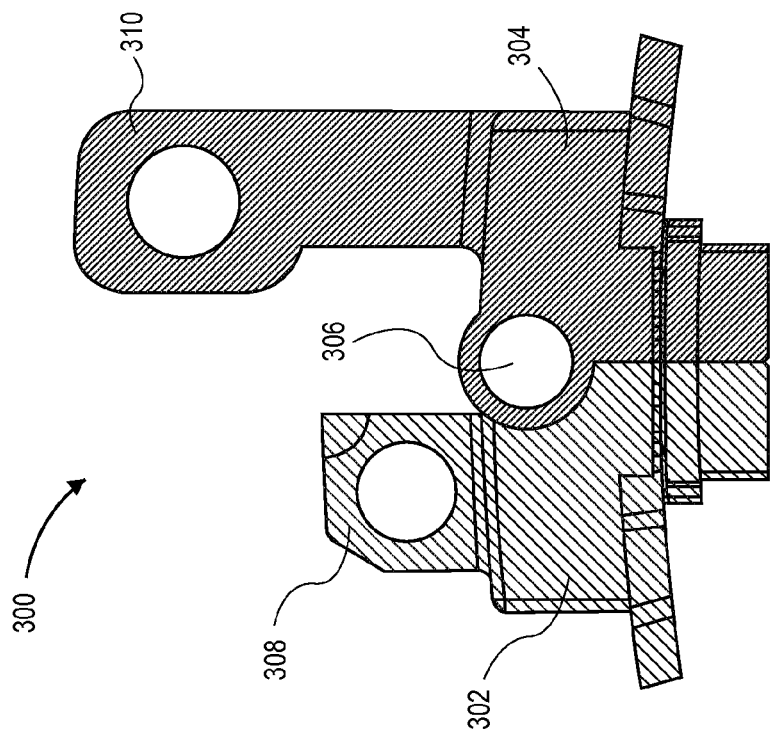
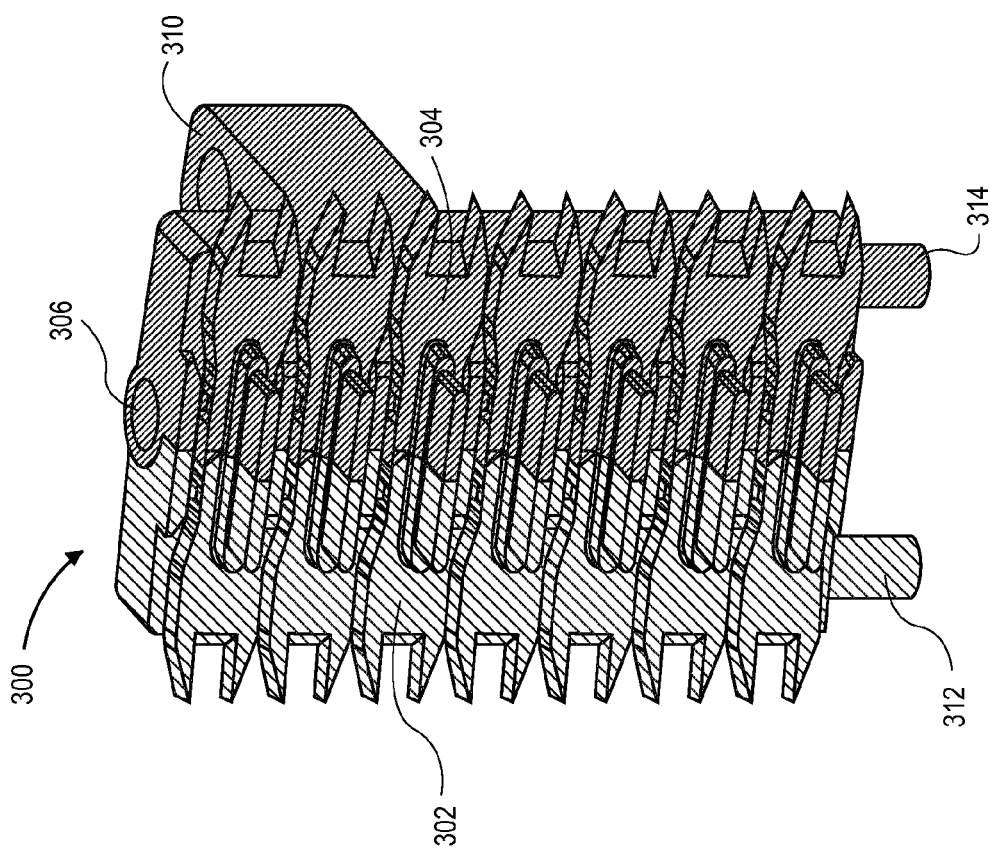
FIG. 3B
FIG. 3A

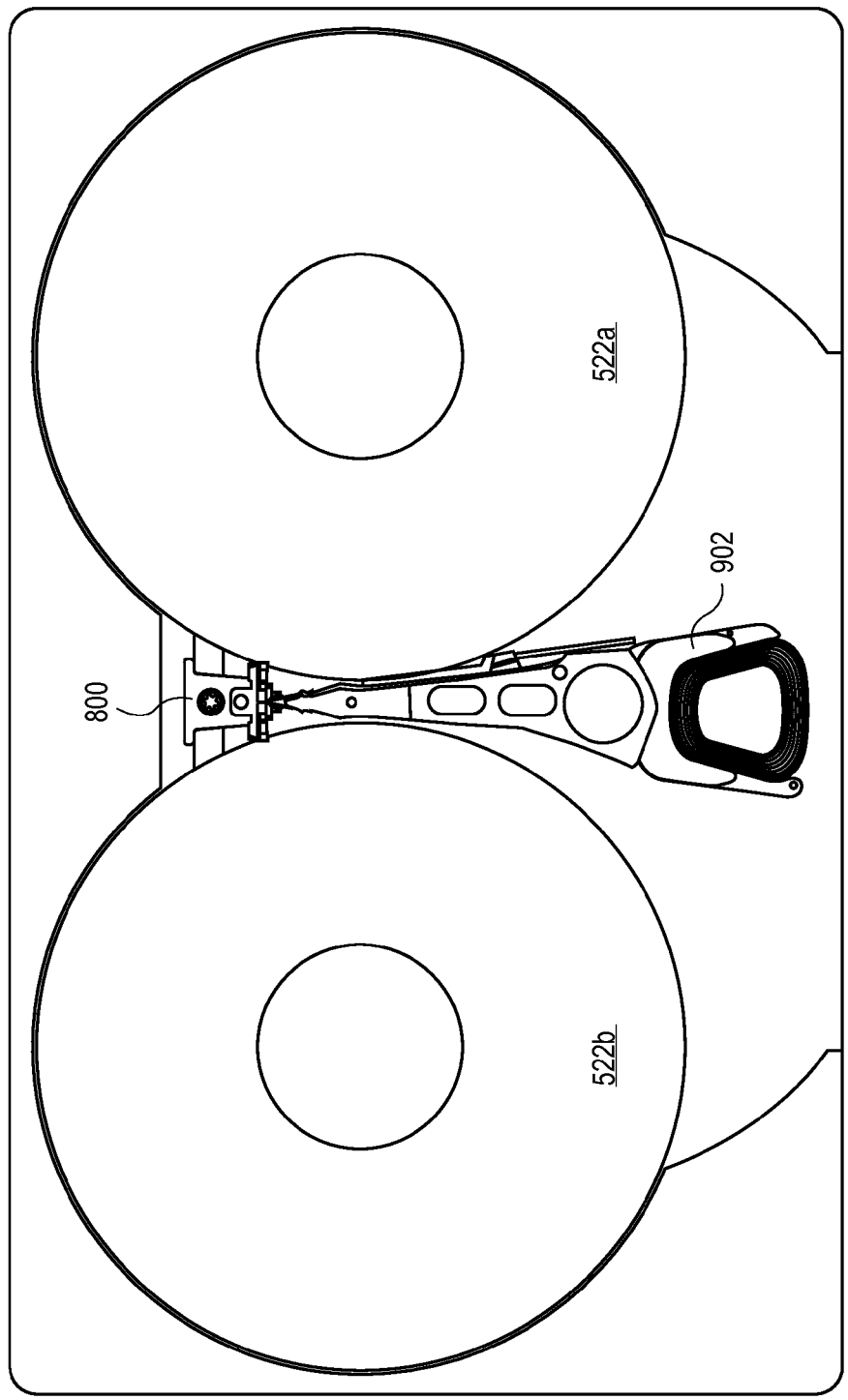

LOAD/UNLOAD RAMPS FOR MULTIPLE DISK-STACK, SHARED ACTUATOR HARD DISK DRIVE

FIELD OF EMBODIMENTS

Embodiments of the invention may relate generally to a multiple disk stack, shared actuator hard disk drive and more particularly to a load/unload ramp for the same.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

While increasing areal density, a measure of the quantity of information bits that can be stored on a given area of disk surface, is one of the ever-present goals of HDD design evolution, the cost per unit of storage is also an ever-present constraint associated with HDD development. The cost per storage capacity, or price per capacity from a consumer's standpoint, is especially important in large data storage scenarios, such as with archival and backup storage in which large amounts of data are stored but infrequently accessed.

One approach to increasing the storage capacity of an HDD while keeping the cost per capacity at a reasonable point is to design an HDD having multiple disk stacks while sharing an actuator among a plurality of the disk stacks. Thus, moving forward with such an approach leads to the need for a design of and the installation of a load/unload ramp (or simply "ramp"). However, this is one of the more challenging components for assembly due to the limited space between the disk stacks.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a load/unload ramp configured for a multiple disk-stack, shared actuator hard disk drive (HDD), an HDD comprising such a ramp, and a method for installing such a ramp into such an HDD. A ramp according to embodiments is a two-piece ramp configured to swivel-engage together. For example, each of the two ramp parts comprises a respective sleeve configured for positioning over a swivel pin constituent to an HDD, according to an embodiment. Furthermore, each of the two ramp parts comprises a respective locking pin configured for positioning and movement within a corresponding receptacle constituent to the base, according to an embodiment.

Thus, according to an embodiment, each ramp part can be positioned to a respective initial locking position onto the base, a first disk stack installed, a first ramp part swiveled to a final locking position and fixed to the base. Then an actuator assembly can be inserted and the corresponding actuator arms parked onto the first ramp part, a second disk stack installed, then the second ramp part swiveled to its final locking position and fixed to the base. With such a ramp arrangement and installation process, the assembly challenges associated with the limited space between the disk stacks are met.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3A is a perspective view illustrating a two-piece HDD ramp in an assembled position, according to an embodiment;

FIG. 3B is a top plan view illustrating the two-piece HDD ramp of FIG. 3A, according to an embodiment;

FIG. 11 is a top plan view illustrating the final assembly position of the one-piece HDD ramp of FIG. 8 in relation to a plurality of disk stacks, according to an embodiment;

DETAILED DESCRIPTION

Approaches to a ramp for a multiple disk-stack, shared actuator hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used for a load/unload ramp assembly for a hard-disk drive (HDD) storage device. Thus, in accordance with an embodiment, a plan view illustrating an HDD 100 is shown in FIG. 1 to illustrate an exemplary operating environment.

Figure 1:
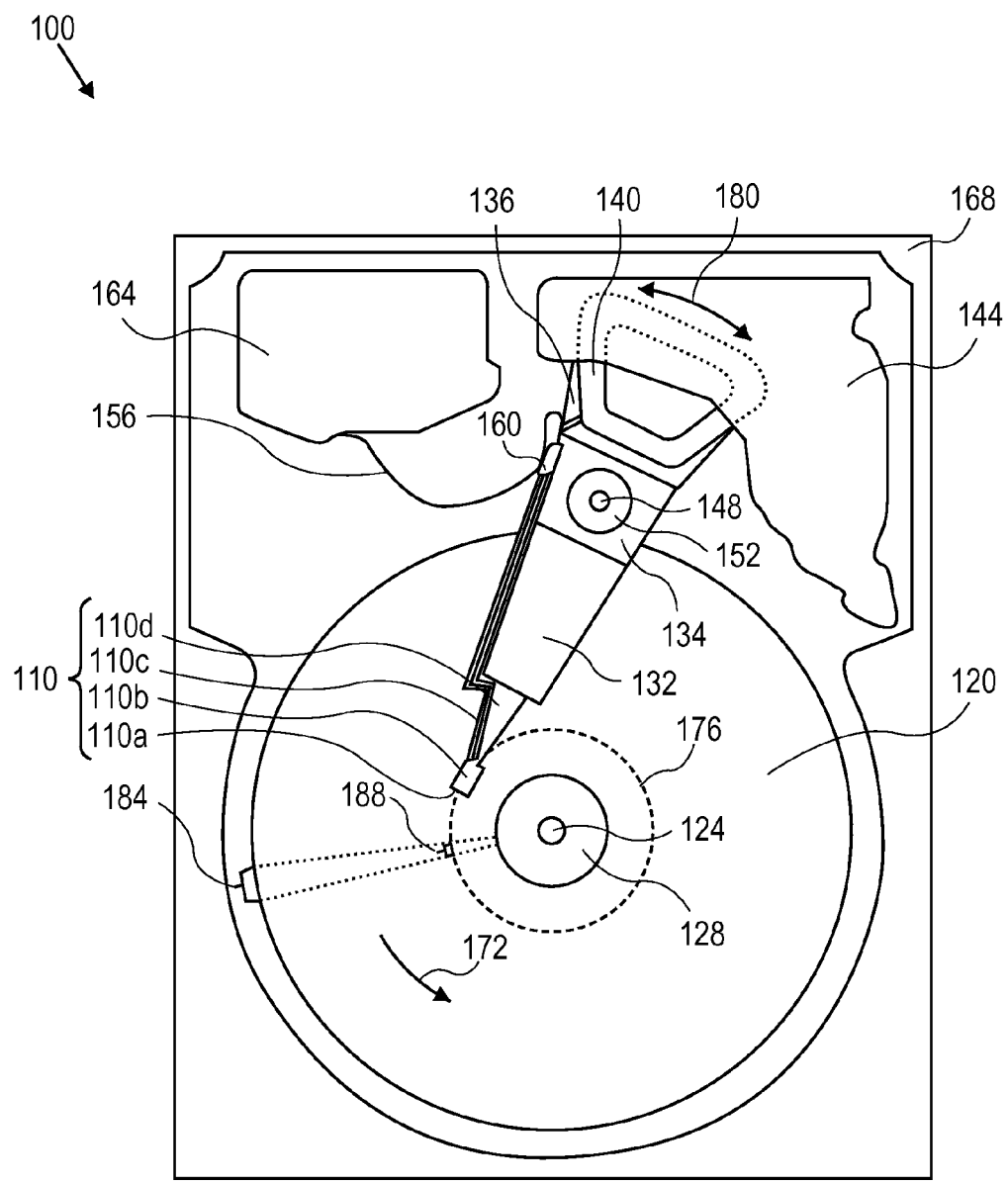
FIG. 1 is a plan view illustrating a hard disk drive, according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

Ramp load/unload technology involves a mechanism that moves the head stack assembly, including the sliders, away from and off the disks and safely positions them onto a cam-like structure. The cam typically includes a shallow ramp on the side closest to the disk. During a power-on sequence, for example, the read/write heads are loaded by moving the sliders off the ramp and over the disk surfaces when the disks reach the appropriate rotational speed. Thus, the terminology used is that the sliders or HSA are "loaded" to or over the disk (i.e., off the ramp) into an operational position, and "unloaded" from the disk (i.e., onto the ramp) such as in an idle position.

As mentioned, one approach to increasing the storage capacity of an HDD while keeping the cost per capacity at a reasonable point is to utilize an HDD having multiple disk stacks while sharing an actuator among a plurality of the disk stacks. With such an approach, the relatively high cost associated with each actuator and corresponding read/write transducer(s) can effectively be amortized over more disk media and, therefore, more storage capacity. However, moving forward with such an approach leads to the need for a design of and the installation of a suitable ramp, which is one of the more challenging components for assembly due to the limited space between the disk stacks.

Multiple Disk-Stack, Shared Actuator Hard Disk Drive

Figure 2:
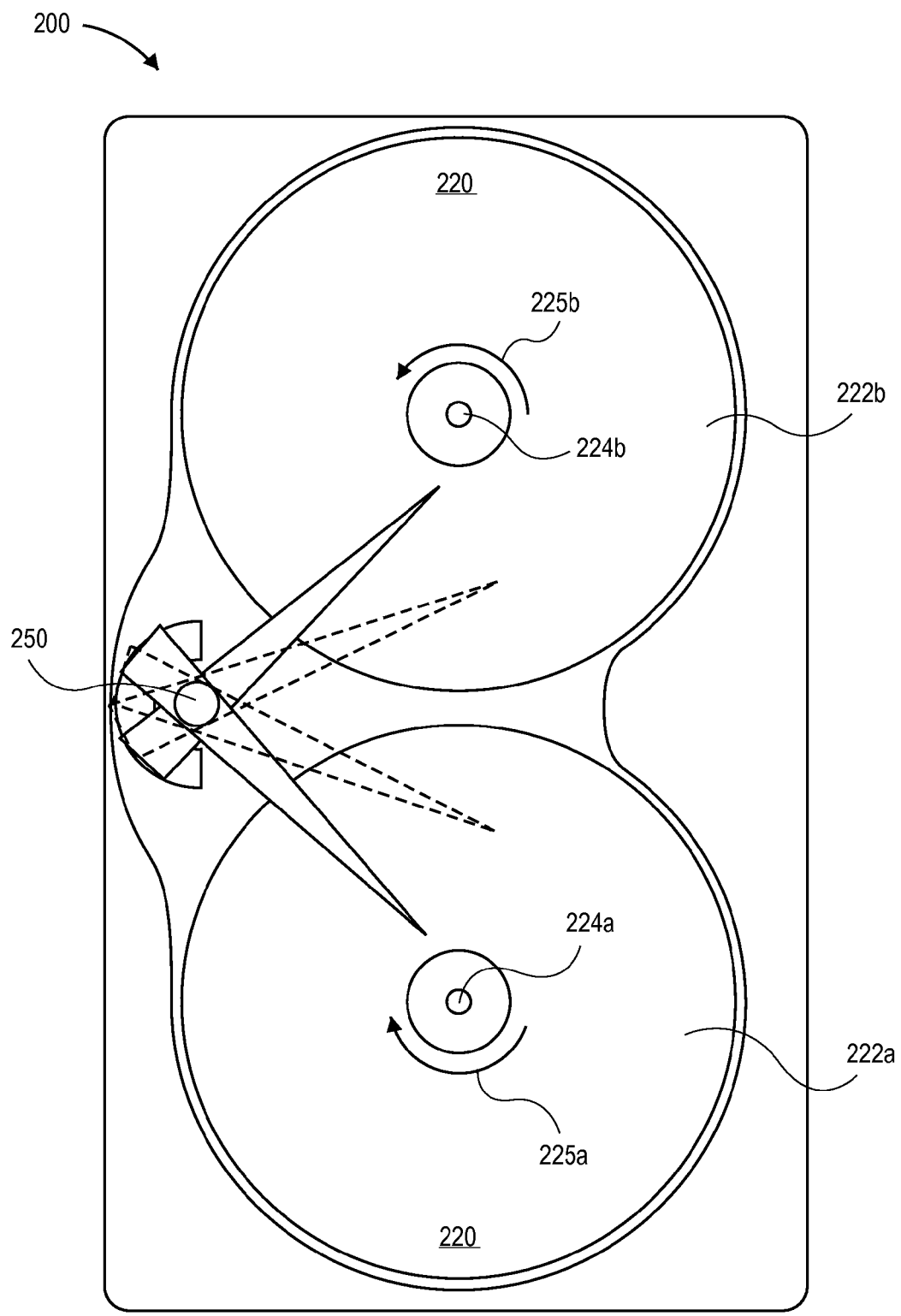
FIG. 2 is a plan view illustrating a two-disk-stack, single actuator HDD, according to an embodiment.

FIG. 2 is a plan view illustrating a two-disk-stack, single actuator HDD, according to an embodiment of the invention. With the exclusion of components and/or assemblies discussed hereafter, the internal components of HDD 200 are similar to or the same as like components of HDD 100 (FIG. 1). Thus, for the purposes of clarity and simplicity, such like components are not necessarily depicted in FIG. 2 or described again in reference to FIG. 2. Reference is made to FIG. 1 and the corresponding description for the showing and description of the components of HDD 200 that are like components of HDD 100. Furthermore, the HDD 200 of FIG. 2 is presented as a non-limiting example of an operating environment in which ramp embodiments described herein may be implemented. However, the type of HDD for which ramp embodiments are utilized may vary from implementation to implementation.

One difference between HDD 200 and HDD 100 (FIG. 1) is that HDD 200 comprises two disk stacks, i.e., disk stack 222a and disk stack 222b, rather than the typical single disk stack. Each of disk stack 222a and 222b comprises one or more disk 220. Preferably but not by way of limitation, each disk stack 222a and 222b would comprise multiple disks, such as ten disks 220 per disk stack 222a, 222b, to provide for a large storage capacity HDD. The one or more disk 220 of each disk stack 222a, 222b are coupled to and rotated by respective spindles, i.e., spindle 224a and spindle 224b.

According to an embodiment, spindle 224a rotates disk stack 222a in one direction while spindle 224b rotates disk stack 222b in the opposite direction. For example, disk stack 222a may rotate in a clockwise direction 225a while disk stack 222b may rotate in a counter-clockwise direction 225b. Thus, with the capability to rotate in opposite directions the disk(s) 220 can generate airflow in both rotational directions so that the head slider is able to maintain its flying angle of attack relative to the rotational airflow over the disk(s) 220 corresponding to each disk stack 222a, 222b. Disk stack 222a and disk stack 222b may rotate simultaneously or may rotate asynchronously. According to an alternative embodiment, each spindle 224a, 224b may rotate its respective disk stack 222a, 222b in the same direction and the head slider would be appropriately positioned over the disk(s) 220 of each disk stack 222a, 222b for read and write operations.

However, and notably, HDD 200 comprises a single head stack assembly (HSA) 250 to service the disks 220 of both disk stack 222a and disk stack 222b. HSA 250 comprises similar components as shown and described in reference to FIG. 1, such as armature 136, voice coil 140 or another type of rotational actuating device, pivot-shaft 148, pivot-bearing assembly 152, carriage 134, arm 132, head gimbal assembly (HGA) 110, arm-electronics (AE) module 160, and flexible interconnect cable 156. The rotational stroke of HSA 250 may be greater than is typical with a conventional HDD voice coil actuator, such as with HDD 100 (FIG. 1), in order to be able to service the two adjacent disk stacks 222a, 222b. According to an embodiment, the actuator portion of HSA 250 is configured to move the head slider in an arc of approximately 90 degrees, to reach all the data tracks of disks 220 of both disk stack 222a and disk stack 222b.

Two-Piece Swivel Ramp

FIG. 3A is a perspective view illustrating a two-piece HDD ramp in an assembled position, and FIG. 3B is a top plan view illustrating the two-piece HDD ramp of FIG. 3A, both according to an embodiment.

Two-piece swivel ramp 300 (also referred to herein simply as "ramp 300") comprises a first ramp part 302 and a second ramp part 304, each of which is configured to engage with the other via a swivel axis, swivel 306, an engagement or coupling also referred to herein as "swivel-engaged". First ramp part 302 and first ramp part 304 are depicted in a final, interlocked, installed position of two-piece swivel ramp 300. As shown and described in more detail hereinafter, the first ramp part 302 may be installed nearer a first disk stack (e.g., disk stack 222b of FIG. 2) and the second ramp part 304 may be installed nearer a second disk stack (e.g., disk stack 222a of FIG. 2).

According to an embodiment, each of first ramp part 302 and second ramp part 304 comprises a respective locking pin, locking pin 312 and locking pin 314, respectively. As is described in more detail hereinafter, locking pin 312 and locking pin 314 are configured for positioning and movement within a respective receptacle, such as constituent to a corresponding HDD base.

According to an embodiment, each of first ramp part 302 and second ramp part 304 comprises a respective mounting feature, mounting lug 308 and mounting lug 310, respectively. As is described in more detail hereinafter, mounting lug 308 and mounting lug 310 are configured for coupling, fastening, fixing the corresponding first ramp part 302 and second ramp part 304 with or to a corresponding HDD base.

Figure 4A:
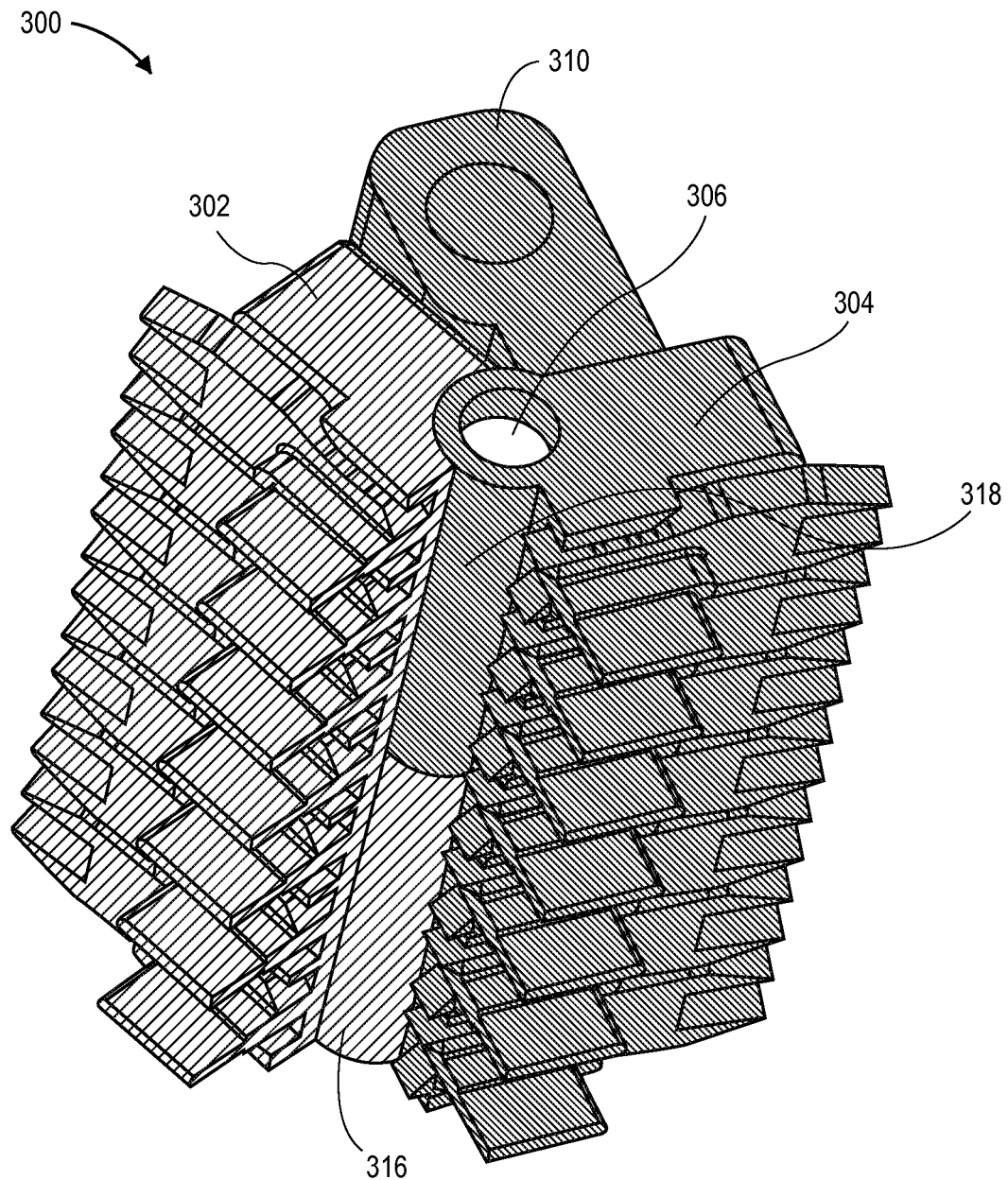
FIG. 4A is a perspective view illustrating a two-piece HDD ramp, according to an embodiment.
Figure 4B:
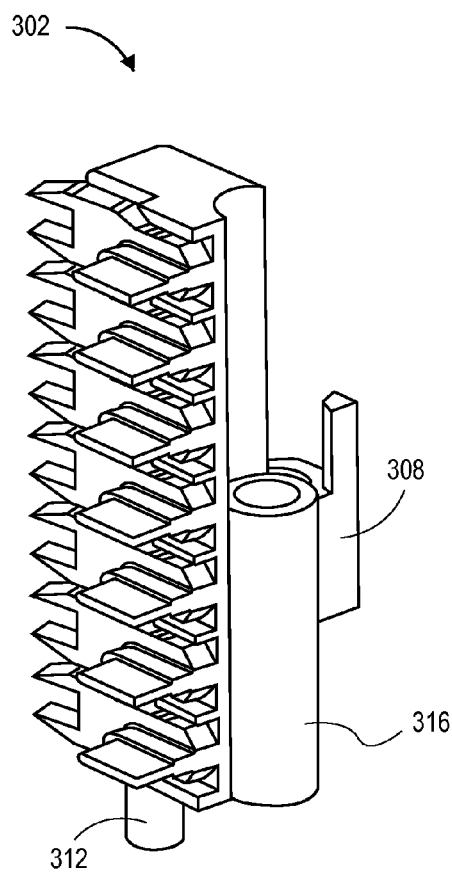
FIG. 4B is a perspective view illustrating a first ramp of the two-piece HDD ramp of FIG. 4A, according to an embodiment.
Figure 4C:
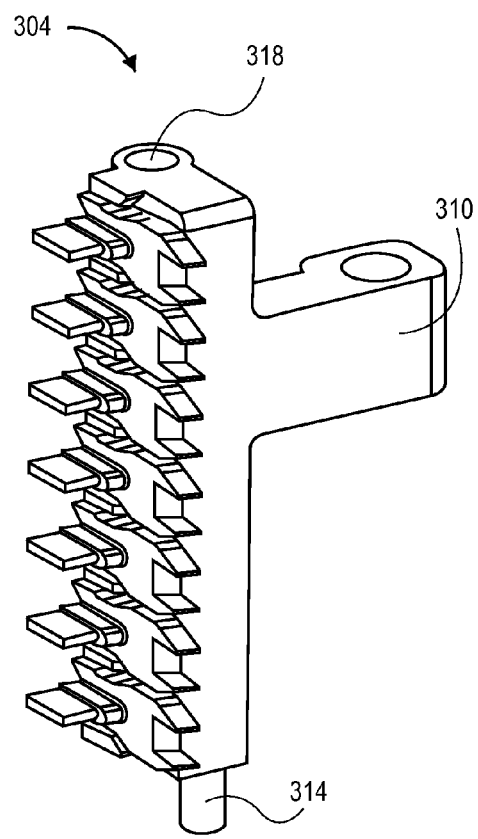
FIG. 4C is a perspective view illustrating a second ramp of the two-piece HDD ramp of FIG. 4A, according to an embodiment.

FIG. 4A is a perspective view illustrating a two-piece HDD ramp, FIG. 4B is a perspective view illustrating a first ramp of the two-piece HDD ramp of FIG. 4A, and FIG. 4C is a perspective view illustrating a second ramp of the two-piece HDD ramp of FIG. 4A, all according to embodiments. In contrast with the depiction of ramp 300 in a final, interlocked engagement as in FIG. 3A, FIG. 4A depicts ramp 300 in an initial, temporary engagement whereby each of the first ramp part 302 and the second ramp part 304 are in an initial installation position, as described in more detail in reference to FIG. 7.

FIG. 4A illustrates ramp 300 comprising the first ramp part 302 and the second ramp part 304, swivel-engaged or engaged with one another via a swivel 306. As such, first ramp part 302 comprises a swivel sleeve 316 which is configured for positioning over a swivel pin (e.g., swivel pin 506 of FIG. 5) and second ramp part 304 comprises a swivel sleeve 318 which is configured for positioning over the swivel pin. Therefore, according to an embodiment, each of first ramp part 302 and second ramp part 304 are configured to swivel, or rotate, about the same swivel pin, or swivel 306. Also visible in FIG. 4A is the mounting lug 310 of second ramp part 304 (see, e.g., FIG. 3B).

FIG. 4B illustrates alone the first ramp part 302, comprising the corresponding mounting lug 308, locking pin 312, and swivel sleeve 316. Similarly in concept and function, FIG. 4C illustrates alone the second ramp part 304, comprising the corresponding mounting lug 310, locking pin 314, and swivel sleeve 318. Swivel sleeve 316 and swivel sleeve 318, along with a swivel pin (e.g., swivel pin 506 of FIG. 5) can be thought of as making up a swivel mechanism such as swivel 306.

Hard Disk Drive Base for Two-Piece Swivel Ramp

Figure 5:
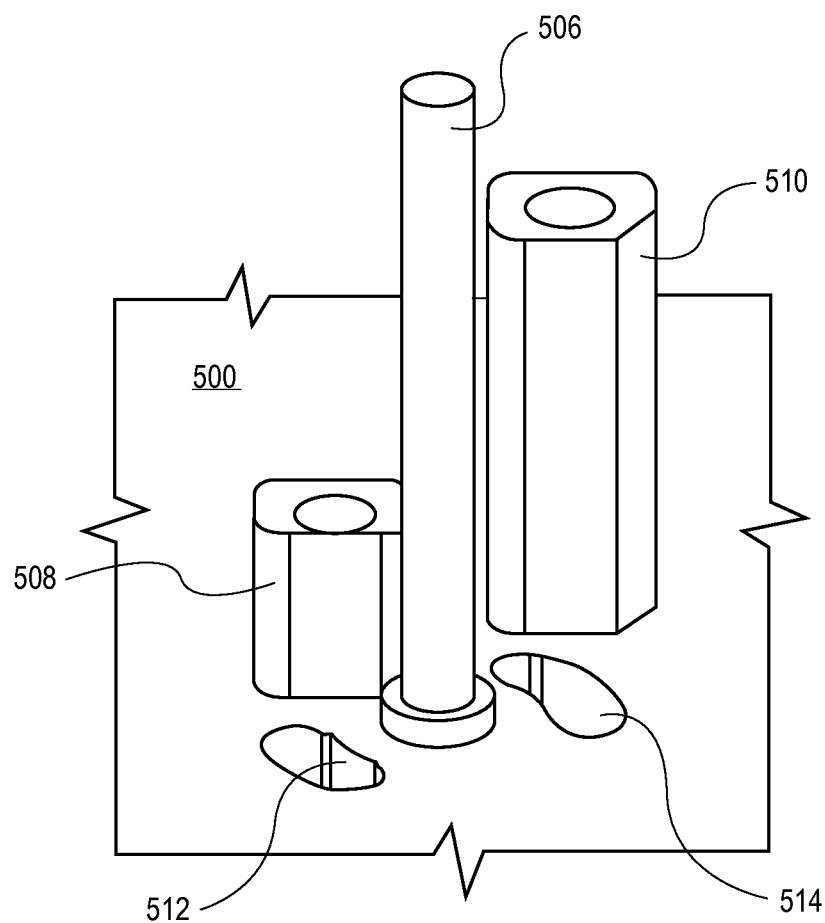
FIG. 5 is a perspective view illustrating features of an HDD base, for attaching the two-piece HDD ramp of FIG. 4A, according to an embodiment.

FIG. 5 is a perspective view illustrating features of an HDD base, for attaching the two-piece HDD ramp of FIG. 4A (and FIG. 3A), according to an embodiment. Base 500 comprises a swivel pin 506, a first mounting platform 508, a second mounting platform 510, a first receptacle 512, and a second receptacle 514.

As mentioned, swivel pin 506 functions as a swivel support structure for ramp 300 (FIGS. 3A, 4A) generally, and for first ramp part 302 (see, e.g., FIG. 4B) and second ramp part 304 (see, e.g., FIG. 4B), specifically. With reference back to FIGS. 4A-4C, it can be appreciated that first ramp part 302 may be installed onto swivel pin 506 followed by second ramp part 304 being installed onto swivel pin 506 to form the ramp 300 assembly, in either an initial temporary position as depicted in FIG. 4A and/or a final position such as depicted in FIG. 3A. However, the manner in which swivel sleeve 316 of first ramp part 302 and swivel sleeve 318 of second ramp part 304 are configured may vary from implementation to implementation. For example, second ramp part 304 may be implemented with the lower swivel sleeve and first ramp part 302 may be implemented with the upper swivel sleeve.

As described, each of first ramp part 302 (see, e.g., FIGS. 3B, 4B) and second ramp part 304 (see, e.g., FIGS. 3B, 4C) comprises a respective mounting feature, mounting lug 308 for first ramp part 302 and mounting lug 310 for second ramp part 304. Base 500 comprises the first mounting platform 508 for mating with mounting lug 308 of first ramp part 302, and the second mounting platform 510 for mating with mounting lug 310 of second ramp part 304. Each mounting lug-mounting platform pair are configured for coupling, fastening, fixing, attaching the respective first ramp part 302 and second ramp part 304 with or to a corresponding HDD base. One non-limiting approach to fastening each mounting lug 308, 310 to its corresponding mounting platform 508, 510 may be to use a screw. The manner in which mounting lug 308 of first ramp part 302 and mounting lug 310 of second ramp part 304, and corresponding mounting platform 508 and mounting platform 510 of base 500, are configured, may vary from implementation to implementation. For example, second ramp part 304 may be implemented with the lower mounting lug to mate with a lower mounting platform on the base while first ramp part 302 may be implemented with the upper mounting lug to mate with a higher mounting platform on the base.

As described, each of first ramp part 302 (see, e.g., FIGS. 3A, 4B) and second ramp part 304 (see, e.g., FIGS. 3A, 4C) comprises a respective locking pin, locking pin 312 for first ramp part 302 and locking pin 314 for second ramp part 304. Base 500 comprises the first receptacle 512 for receiving locking pin 312 of first ramp part 302, and second receptacle 514 for receiving locking pin 314 of second ramp part 304. Each of first receptacle 512 and second receptacle 514 are configured for receiving, positioning and movement of a respective locking pin such as first locking pin 312 and second locking pin 314, respectively. The locking pins 312, 314 allow the respective first ramp part 302, second ramp part 304 to lock in place during disk installation and removal, without the need for screws. Furthermore, the locking pins 312, 314 and receptacles 512, 514 also provide tilt stability during ramp part 302, 304 rotation.

According to an embodiment, the first receptacle 512 and the second receptacle 514 (which may also be envisioned as cut-outs in the base) are curved in shape, thereby allowing a corresponding first ramp part 302 or second ramp part 304 to swivel or rotate about swivel pin 306 and to lock into various positions by way of locking pin 312 and locking pin 314, respectively, such as during installation of ramp 300 (FIGS. 3A, 4A) with base 500. According to a related embodiment, the first receptacle 512 and the second receptacle 514 are substantially curved-elliptical in shape, e.g., kidney-shaped or bean-shaped. Further and according to an embodiment, each receptacle 512, 514 is configured with one or more detent feature, for positioning and holding a respective locking pin 312, 314 in a manner such that they can be released by applied force. In a related embodiment, each receptacle 512, 514 comprises at least two detent features, one detent associated with an initial ramp part 302, 304 position and one detent feature associated with a final ramp part 302, 304 position.

Figure 6B:
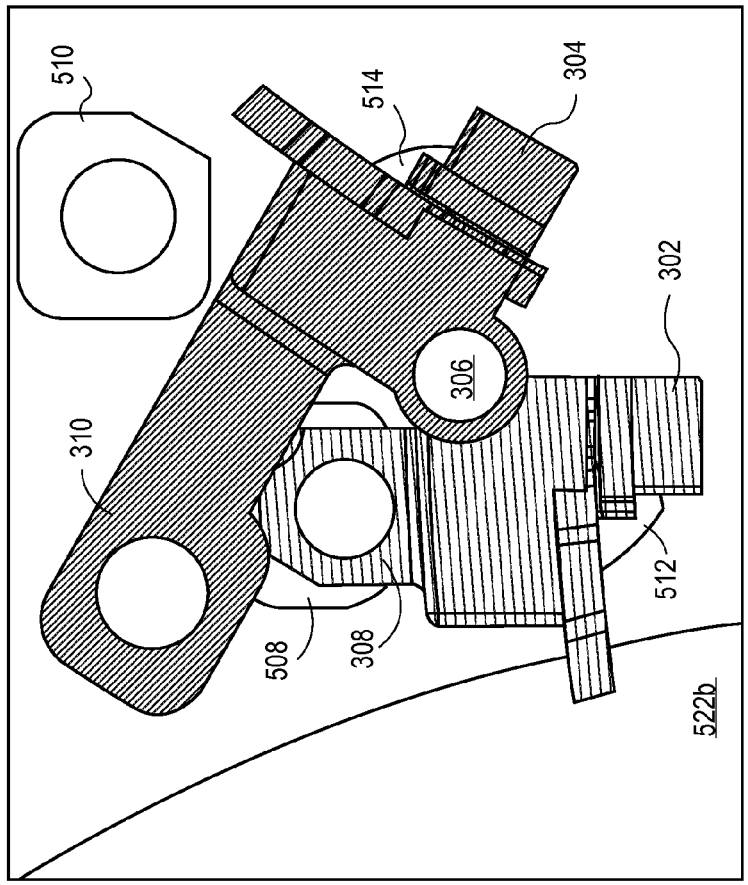
FIG. 6B is a top plan view illustrating a second intermediate assembly position of the two-piece HDD ramp of FIG. 4A, according to an embodiment.
Figure 6A:
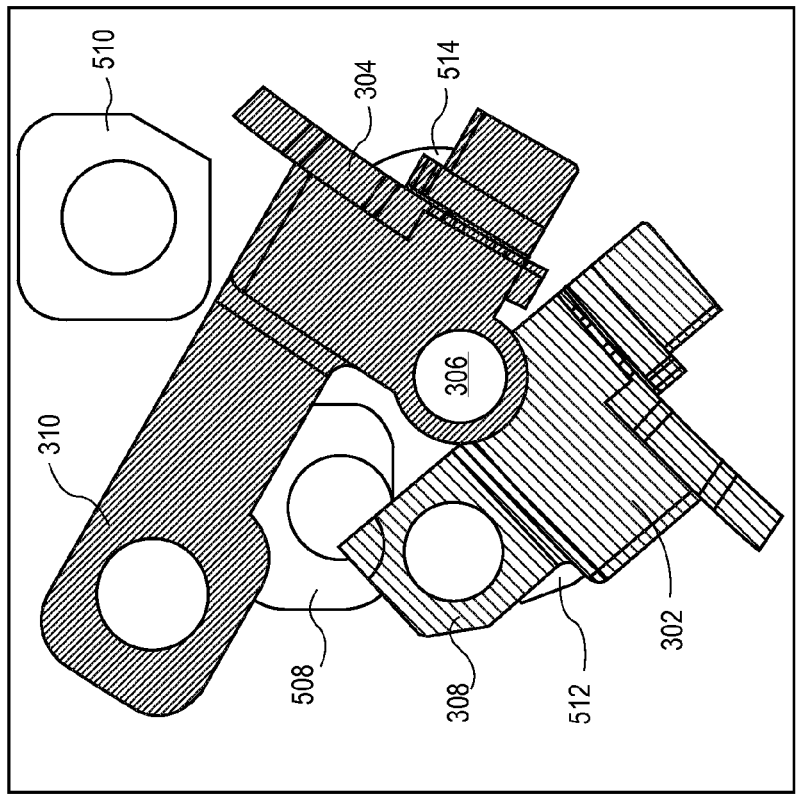
FIG. 6A is a top plan view illustrating a first initial assembly position of the two-piece HDD ramp of FIG. 4A, according to an embodiment.
Figure 6C:
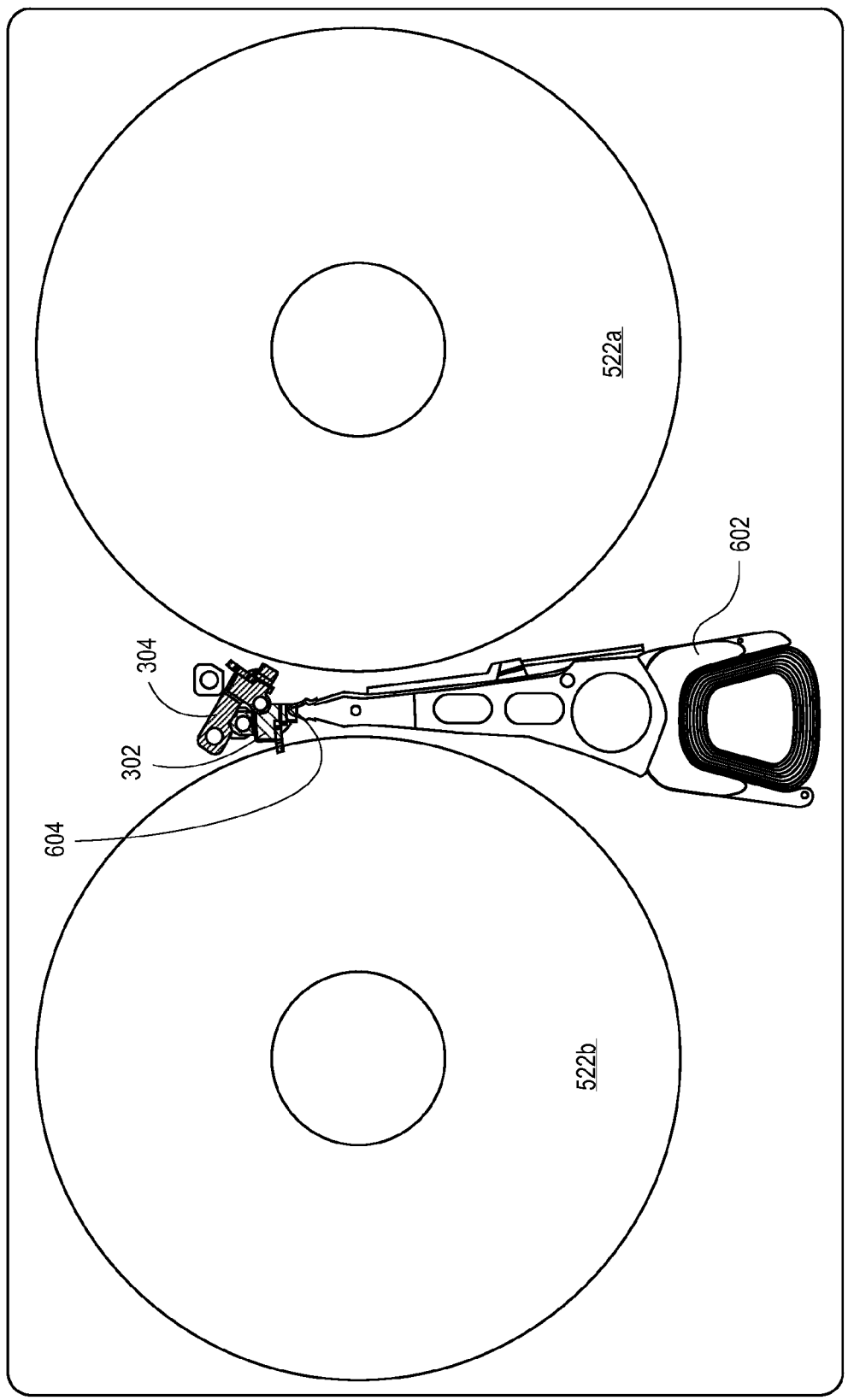
FIG. 6C is a top plan view illustrating the second intermediate assembly position of the two-piece HDD ramp of FIG. 4A in relation to a plurality of disk stacks, according to an embodiment.
Figure 6D:
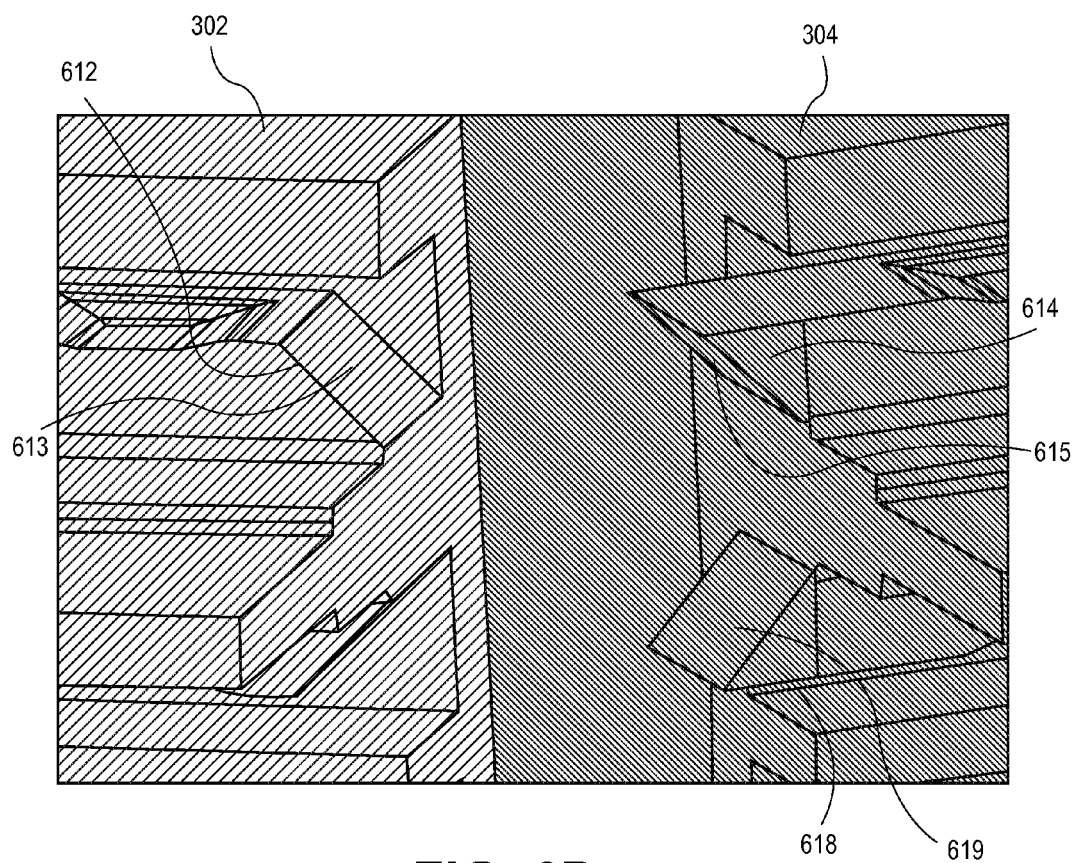
FIG. 6D is a perspective view illustrating a self-aligning feature of the two-piece HDD ramp of FIG. 4A, according to an embodiment.
Figure 6E:
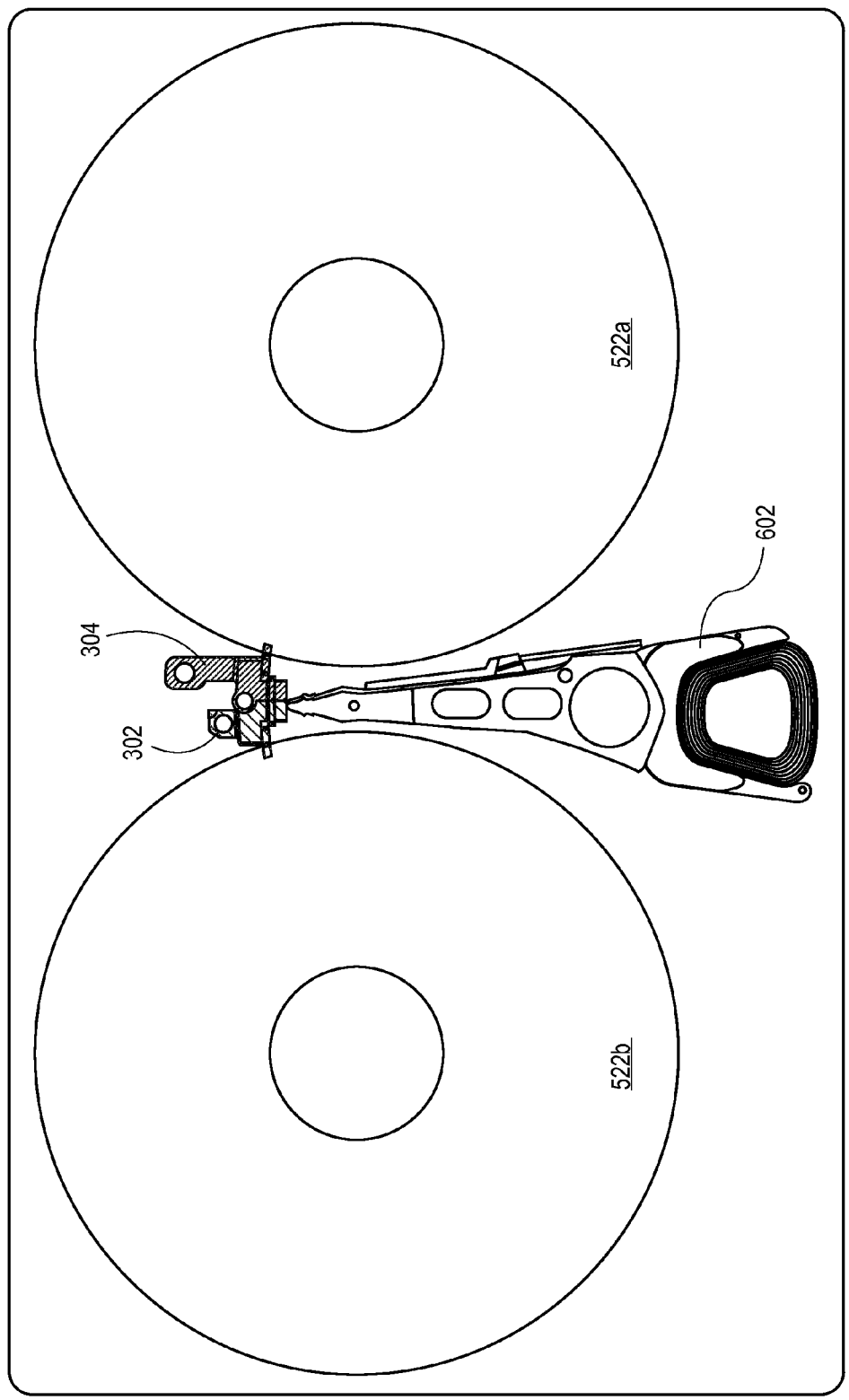
FIG. 6E is a top plan view illustrating a final assembly position of the two-piece HDD ramp of FIG. 4A in relation to a plurality of disk stacks, according to an embodiment.
Figure 7:
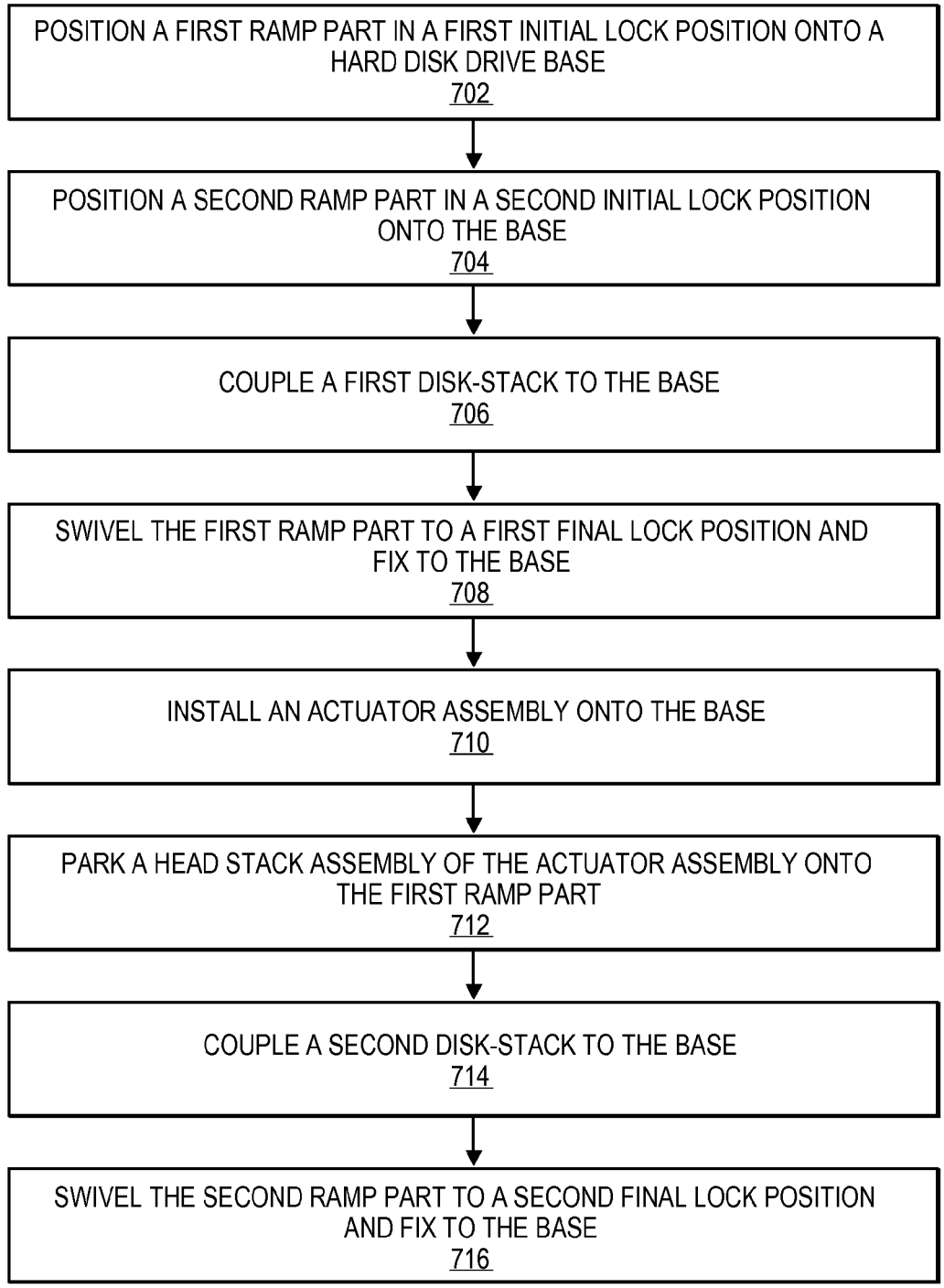
FIG. 7 is a flow diagram illustrating a method of installing a two-piece HDD ramp, according to an embodiment.

Method for Installing a Swivel Ramp into a Multiple Disk-Stack, Shared Actuator HDD FIG. 7 is a flow diagram illustrating a method of installing a two-piece HDD ramp, according to an embodiment. FIGS. 6A-6E are presented and referenced to further describe and exemplify the method of FIG. 7. FIG. 6A is a top plan view illustrating a first initial assembly position of the two-piece HDD ramp of FIG. 4A, according to an embodiment. FIG. 6B is a top plan view illustrating a second intermediate assembly position of the two-piece HDD ramp of FIG. 4A, according to an embodiment. FIG. 6C is a top plan view illustrating the second intermediate assembly position of the two-piece HDD ramp of FIG. 4A in relation to a plurality of disk stacks, according to an embodiment. FIG. 6E is a top plan view illustrating a final assembly position of the two-piece HDD ramp of FIG. 4A in relation to a plurality of disk stacks, according to an embodiment.

At block 702, a first ramp part is positioned in a first initial lock position onto a hard disk drive base. For example and in reference to FIG. 6A, first ramp part 302 is positioned at an initial position, where locking pin 312 (FIG. 3A) is inserted into and received by first receptacle 512 of base 500 (FIG. 5), at the lowermost locking position (toward the bottom of the page illustrating FIG. 6A) within first receptacle 512.

At block 704, a second ramp part is positioned in a second initial lock position onto a hard disk drive base. For example and in reference to FIG. 6A, second ramp part 304 is positioned at an initial position, where locking pin 314 (FIG. 3B) is inserted into and received by second receptacle 514 of base 500 (FIG. 5), at the uppermost locking position (toward the top of the page illustrating FIG. 6A) within second receptacle 514.

At block 706, a first disk stack is coupled to the base. For example and in reference to FIG. 6B, disk stack 522b is assembled into, installed into and/or fastened to hard disk drive base 500 (FIG. 5).

At block 708, the first ramp part is swiveled to a first final lock position and fixed to the base. For example and in reference to FIG. 6B, first ramp part 302 is swiveled clockwise, about swivel 306 and guided by locking pin 312 (FIG. 4B) within receptacle 512 (FIG. 5), from its initial lock position of FIG. 6A to its final lock position of FIG. 6B. Note that the disks of the disk stack 522b are now interposed between respective features of first ramp 302 (e.g., air damping vane features). At this final lock position for first ramp part 302, first ramp 302 can be fixedly attached and fastened to base 500 by way of, e.g., a screw, through mounting lug 308 and mounting platform 508.

At block 710, an actuator assembly is installed onto the base and, at block 712, a head stack assembly (HSA) of the actuator assembly is parked onto the first ramp part. For example, actuator assembly 602 is installed onto the base 500 (FIG. 5), and the HSA suspension assembly 604 is parked onto the first ramp part 302. That is, the first ramp part 302, in its final locking position, is now suitably positioned for receiving each respective proximal end (e.g., a tab, or "merge lip") of the HSA suspension assembly 604 onto a parking area of first ramp 302.

At block 714, a second disk stack is coupled to the base. For example and in reference to FIG. 6C, disk stack 522a is assembled into, installed into and/or fastened to hard disk drive base 500 (FIG. 5). Note in FIG. 6C that the first ramp part 302 and the second ramp part 304 are positioned as in FIG. 6B.

At block 716, the second ramp part is swiveled to a second final lock position and fixed to the base. For example and in reference to FIG. 6E, second ramp part 304 is swiveled clockwise, about swivel 306 and guided by locking pin 314 (FIG. 4C) within receptacle 514 (FIG. 5), from its initial lock position of FIGS. 6A, 6B to its final lock position of FIG. 6E. Note that the disks of the disk stack 522a are now interposed between respective features of second ramp 304 (e.g., air damping vane features). At this final lock position for second ramp part 304, second ramp 304 can be fixedly attached and fastened to base 500 by way of, e.g., a screw, through mounting lug 310 (see, e.g., FIGS. 3B, 4C) and mounting platform 510 (FIG. 5).

With reference to FIG. 6E, actuator assembly 602 may comprise a head separator that is a temporary part used to keep the head sliders from contact damage during transporting and downstream manufacturing processes. In such a scenario, the head separator may be removed from the actuator assembly 602 after parking the HSA onto the first ramp part 304 at block 712.

FIG. 6E illustrates the ramp 300 in a final installed position relative to disk stack 522a and disk stack 522b. Thus, first ramp part 302 and second ramp part 304 are interlocked together in an arrangement such as depicted in FIGS. 3A, 3B.

FIG. 6D is a perspective view illustrating a self-aligning feature of the two-piece HDD ramp of FIG. 4A, according to an embodiment. According to an embodiment, first ramp 302 comprises a first wedge shaped feature 612 having a first plane 613. Similarly, second ramp 304 comprises a second wedge shaped feature 614 having a second plane 615. These wedge shaped features 612, 614 serve a self-aligning function such that when second ramp part 304 is swiveled into its final position (e.g., at block 716 of FIG. 7), the first plane 613 of the first wedge shaped feature 612 of the first ramp part 302 physically mates with the second plane 615 of the second wedge shaped feature 614 of the second ramp part 304, thereby ensuring relatively accurate alignment among the two ramp parts 302, 304. Similarly, each ramp part 302, 304 may have a plurality of such wedge shaped features and planes, such as wedge shaped feature 618 and plane 619 of second ramp part 304, positioned along the height of each ramp part, for further ensuring accurate alignment among the two ramp parts. Further, wedge shaped feature 612 and similar wedge shaped features may assist with the initial contact of the merge lip to the ramp when parking the HSA suspensions onto the first ramp 302, such as at block 712 of FIG. 7.

A two-piece swivel ramp, such as ramp 300, is described and illustrated herein in the context of a multiple disk-stack, shared actuator hard disk drive having two disk stacks. However, implementation of the two-piece swivel ramp is not limited to use with a dual-disk-stack HDD configuration. Rather, the presence of more than two disk stacks could lead to the implementation of multiple two-piece swivel ramps as described herein. For example, consideration is given to the implementation of one two-piece swivel ramp for every two disk stacks, and/or a two-piece swivel ramp between every adjacent disk stack, and the like.

One-Piece Bridge Ramp with Integrated Tooling Features

Figure 8:
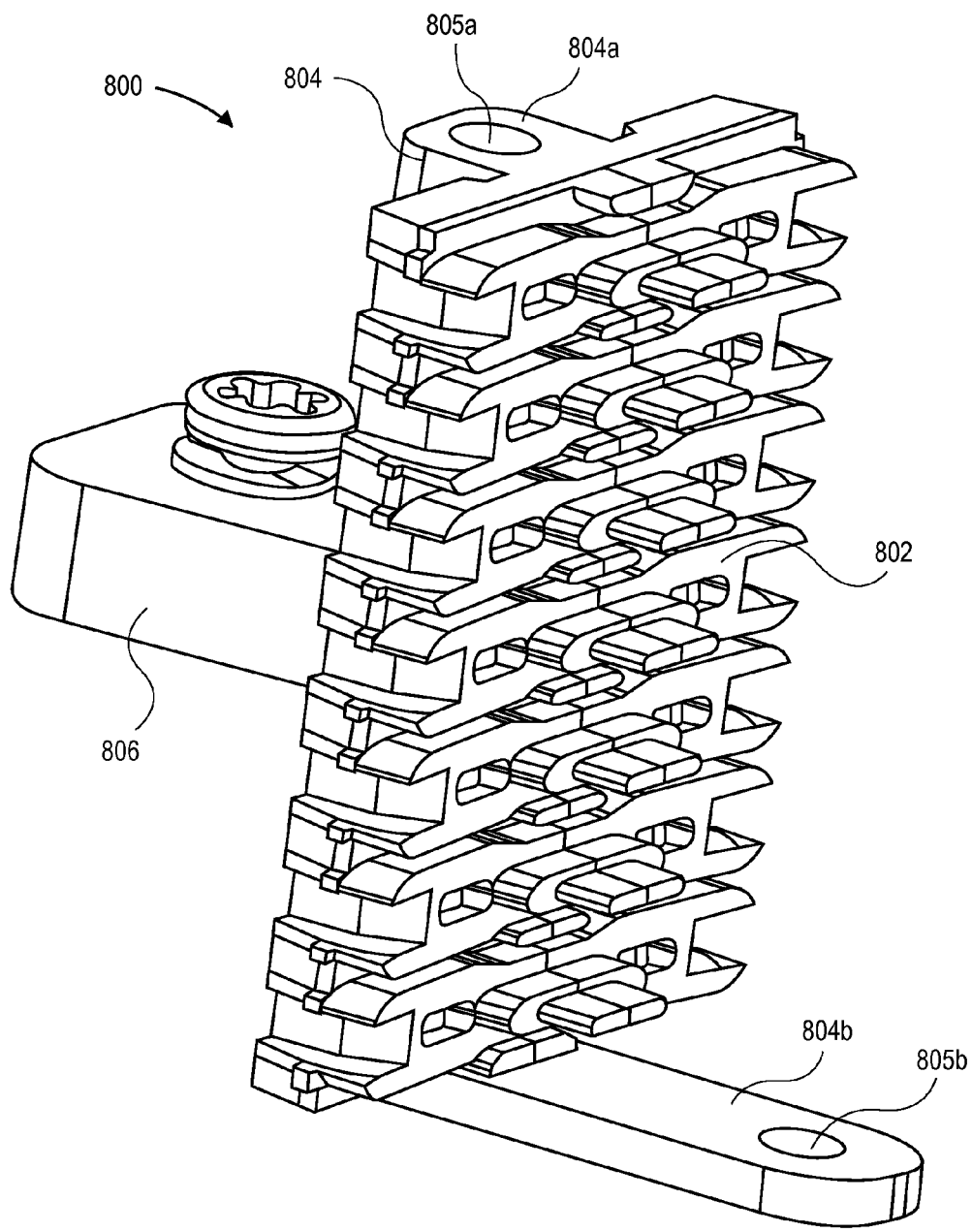
FIG. 8 is a perspective view illustrating a one-piece HDD ramp with an integrated tooling part, according to an embodiment.

FIG. 8 is a perspective view illustrating a one-piece HDD ramp with an integrated tooling part, according to an embodiment. HDD ramp assembly 800 comprises a ramp part 802 and a tooling part 804.

Ramp part 802 is configured for loading and unloading a head stack assembly (HSA) from both directions, so that the ramp 800 is compatible with a multiple disk-stack, shared actuator HDD. As such, ramp 800 (or ramp assembly 800), generally, and ramp part 802, specifically, is configured for unloading an HSA from and loading an HSA to multiple disk stacks (see, e.g., disk stack 522a and disk stack 522b of FIG. 11).

Tooling part 804 may be coupled with or integral to (e.g., from a single mold) the ramp part 802. Tooling part 804 is configured to couple with a head stack assembly handling part (see, e.g., HSA handling part 904 of FIG. 9). According to an embodiment, ramp part 804 comprises a upper tooling support fixture 804a (upper fixture 804a) which extends in a certain direction (a first direction) and a lower tooling support fixture 804b (lower fixture 804b) which extends in an opposing direction (a second direction). For example and according to an embodiment, upper fixture 804a extends in a direction away from a voice coil actuator and lower fixture 804b extends in the direction of, or toward, the voice coil actuator (see, e.g., FIG. 9). Upper fixture 804a comprises a receptacle 805a for receiving the HSA handling part and lower fixture 804b comprises a receptacle 805b for receiving the HSA handling part. Ramp 800 further comprises a mounting lug 806 configured for fastening the ramp 800 to an HDD base.

Figure 9:
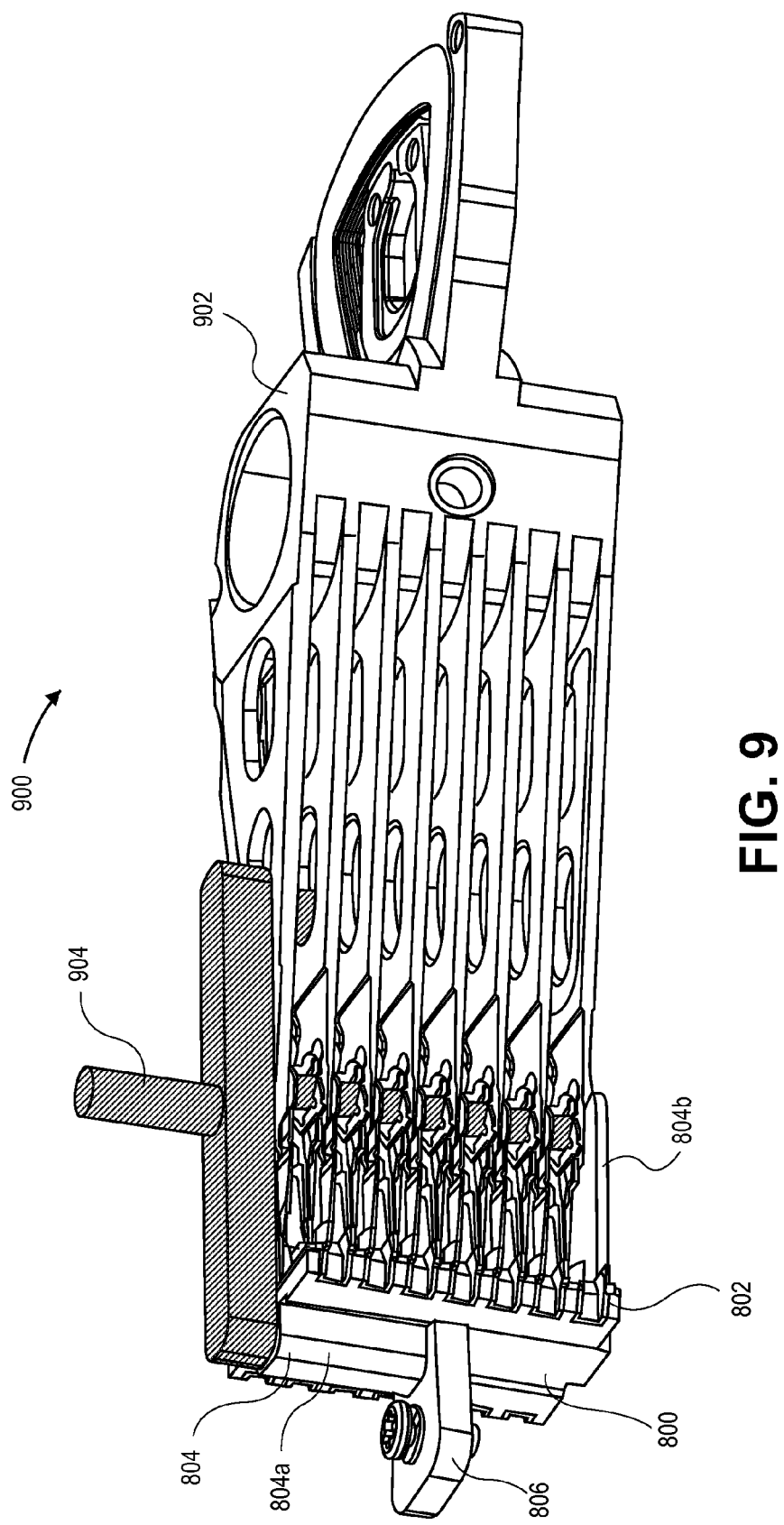
FIG. 9 is a perspective view illustrating a head stack assembly (HSA) merged with the one-piece HDD ramp of FIG. 8, along with a temporary handling tool, according to an embodiment.

FIG. 9 is a perspective view illustrating a head stack assembly (HSA) merged with the one-piece HDD ramp of FIG. 8, along with a temporary handling tool, according to an embodiment. FIG. 9 depicts a ramp-HSA assembly 900, including the ramp part 802, the tooling part 804, and the mounting lug 806 of ramp 800, as well as the upper fixture 804a and the lower fixture 804b of tooling part 804. FIG. 9 further depicts an HSA 902 merged with the ramp 800, as well an HSA handling part 904 coupled with the ramp-HSA assembly 900.

Figure 10A:
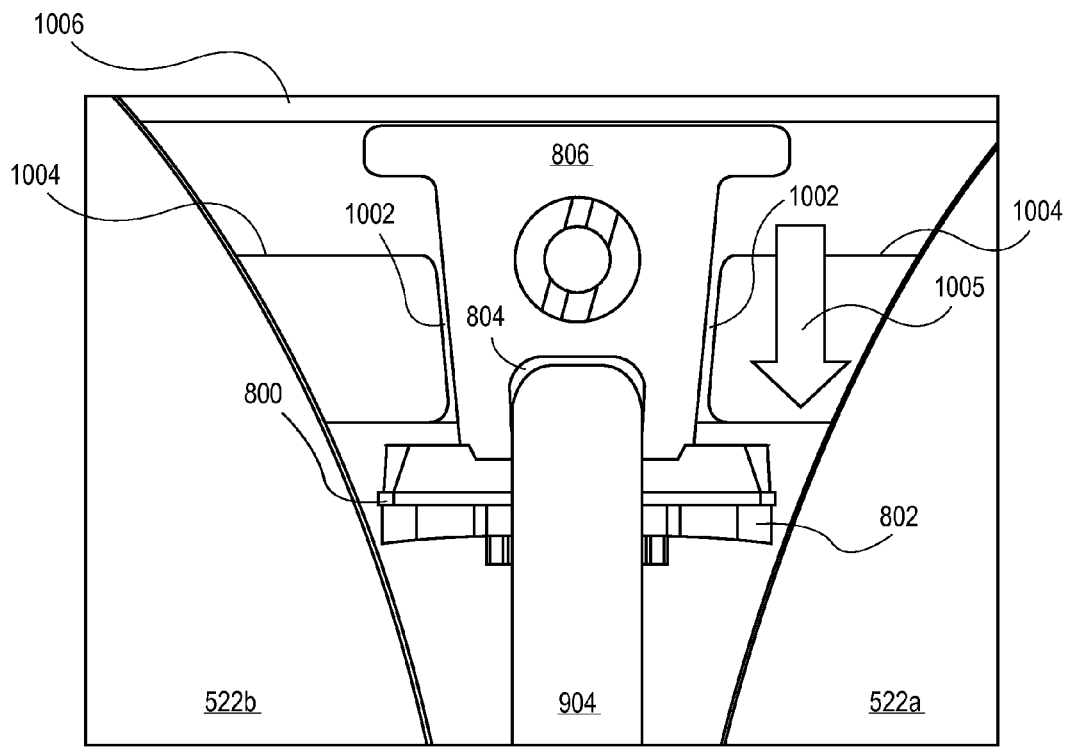
FIG. 10A is a top plan view illustrating an initial assembly position of the one-piece HDD ramp of FIG. 8, according to an embodiment.
Figure 10B:
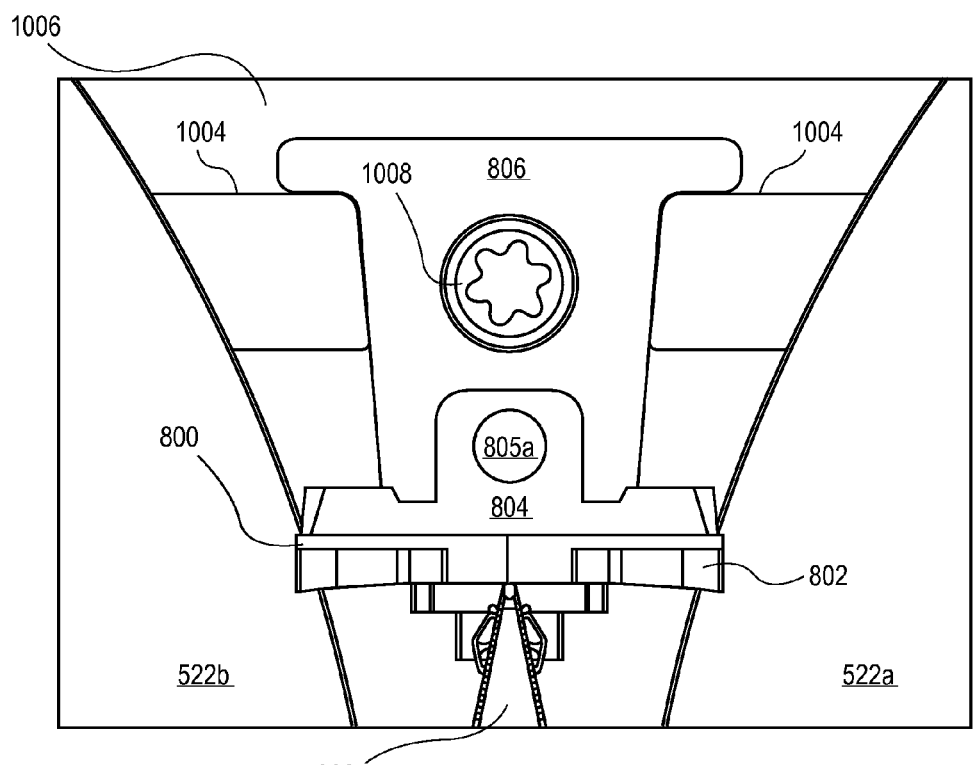
FIG. 10B is a top plan view illustrating a final assembly position of the one-piece HDD ramp of FIG. 8, with the temporary handling tool removed, according to an embodiment.
Figure 12A:
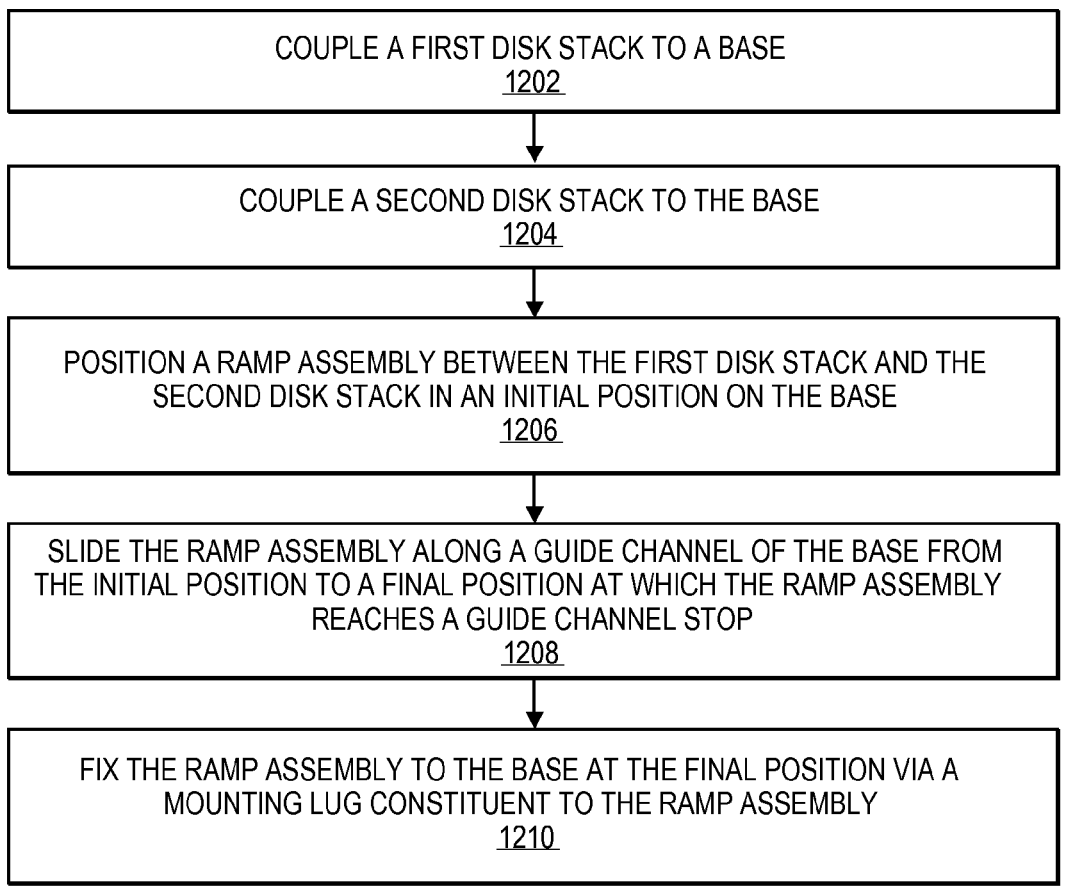
FIG. 12A is a flow diagram illustrating a method of installing a one-piece HDD ramp, according to an embodiment.

Method for Installing a Bridge Ramp into a Multiple Disk-Stack, Shared Actuator HDD FIG. 12A is a flow diagram illustrating a method of installing a one-piece HDD ramp, according to an embodiment. FIG. 10A is a top plan view illustrating an initial assembly position of the one-piece HDD ramp of FIG. 8, and FIG. 10B is a top plan view illustrating a final assembly position of the one-piece HDD ramp of FIG. 8, with the temporary handling tool removed, both according to embodiments. FIGS. 10A, 10B are presented to assist with the description of and in reference to the methods illustrated in FIGS. 12A, 12B.

With reference to FIG. 12A, at block 1202 a first disk stack is coupled to a base. For example and with reference to FIG. 10A, disk stack 522a is coupled to base 1006. At block 1204 a second disk stack is coupled to the base. For example and with reference to FIG. 10A, disk stack 522b is coupled to base 1006.

At block 1206, a ramp assembly is positioned between the first disk stack and the second disk stack, in an initial position on the base. For example and with reference to FIG. 10A, ramp assembly 800 is positioned between disk stack 522a and disk stack 522b, in an initial position on base 1006. All the while, because HSA handling part 904 is coupled with the ramp-HSA assembly 900 (FIG. 9), which includes the ramp assembly 800, the HSA handling part 904 can be used to handle the ramp assembly 800. Thus, the HSA handling part 904 can be used to move (generally, in the Z-direction, or into the page) the ramp assembly 800 into the confines of the base 1006.

At block 1208, the ramp assembly is slid along a guide channel of the base, from the initial position, to a final position at which the ramp assembly reaches a guide channel stop. For example and with reference to FIG. 10B, ramp assembly 800 is slid along a guide channel 1002 of the base 1006, from the initial position (e.g., at the position illustrated in FIG. 10A), to a final position (e.g., at the position illustrated in FIG. 10B) at which the ramp assembly reaches a guide channel stop 1004. Again, because HSA handling part 904 is coupled with the ramp-HSA assembly 900 (FIG. 9), which includes the ramp assembly 800, the HSA handling part 904 can be used to handle the ramp assembly 800. Thus, the HSA handling part 904 can be used to move (generally, in the X-direction, or in the direction of arrow 1005 shown in FIG. 10A) the ramp assembly 800 into the final installation position.

At block 1210, the ramp assembly is fixed to the base at the final position, via a mounting lug constituent to the ramp assembly. For example and with reference to FIG. 10B, ramp assembly 800 is fixed or fastened to the base 1006 at the final installation and operational position between the disk stack 522a and the disk stack 522b, via mounting lug 806 of ramp assembly 800. Any suitable means may be used to fix the ramp assembly 800 to the base 1006, such as by using a screw 1008.

FIG. 11 is a top plan view illustrating the final assembly position of the one-piece HDD ramp of FIG. 8 in relation to a plurality of disk stacks, according to an embodiment. FIG. 11 illustrates the ramp 800 in a final installed position relative to disk stack 522a and disk stack 522b, with the HSA 902 parked (or unloaded) on the ramp 800, a position from which either and both disk stacks 522a, 522b can be served. Note that the disks of the disk stacks 522a, 522b are now interposed between respective features of ramp 800 (e.g., air damping vane features).

Figure 12B:
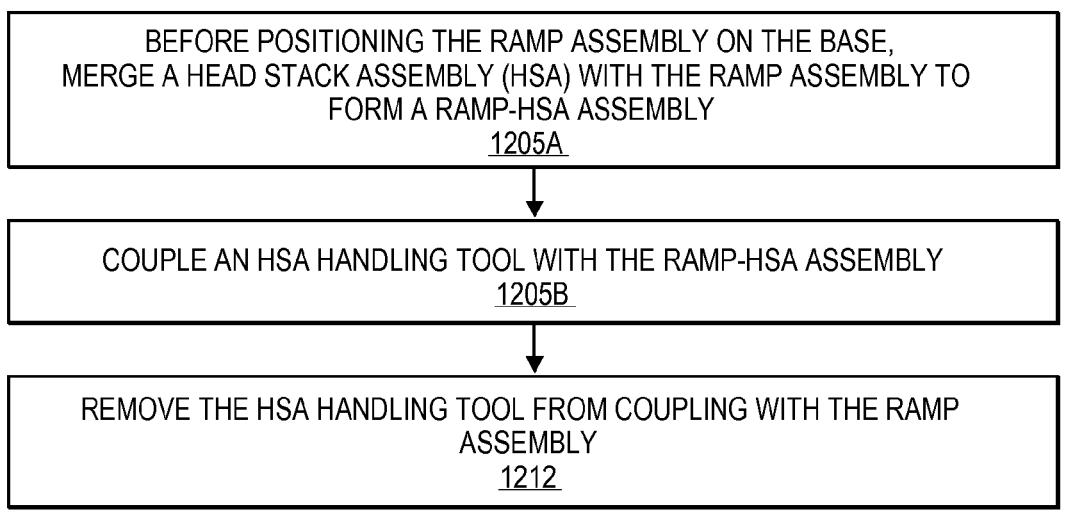
FIG. 12B is a flow diagram illustrating a method of installing a one-piece HDD ramp, according to an embodiment.

FIG. 12B is a flow diagram illustrating a method of installing a one-piece HDD ramp, according to an embodiment. The method of FIG. 12B may be implemented, if at all, in conjunction with the method of FIG. 12A, and is described in that context.

With reference to FIG. 12B, at block 1205A, before positioning the ramp assembly on the base (e.g., at block 1206 of FIG. 12A), a head stack assembly (HSA) is merged with the ramp assembly to form a ramp-HSA assembly. For example and with reference to FIG. 9, HSA 902 is merged with the ramp 800 to form the ramp-HSA assembly 900.

At block 1205B, again before positioning the ramp assembly on the base (e.g., at block 1206 of FIG. 12A), an HSA handling tool is coupled with the ramp-HSA assembly. For example and with reference to FIG. 9, HSA handling tool 904 is coupled with the ramp-HSA assembly 900. According to an embodiment, coupling the HSA handling tool 904 with the ramp assembly-HSA assembly includes inserting a first protrusion of the HSA handling tool into a receptacle constituent to the upper tooling support fixture, inserting a pin of said HSA handling tool into a receptacle constituent to the lower tooling support fixture, and inserting a second protrusion of the HSA handling tool into a receptacle constituent to the HSA. For example, a first protrusion of the HSA handling tool 904 is inserted into receptacle 805a (FIG. 8) of upper fixture 804a (FIGS. 8, 9), a pin of the HSA handling tool 904 is inserted into receptacle 805b (FIG. 8) of lower fixture 804b (FIGS. 8, 9), and a second protrusion of the HSA handling tool 904 is inserted into a cut-out of HSA 902 (FIG. 9), as collectively illustrated in FIG. 9. Note that all of the foregoing insertion operations may be performed simultaneously or concurrently, by pushing the HSA handling tool 904 into the ramp-HSA assembly 900, rather than serially.

At block 1212, the HSA handling tool is removed from its coupling with the ramp assembly. For example and with reference to FIGS. 10A, 10B, HSA handling tool 904 is removed from being coupled with the ramp-HSA assembly 900 (FIG. 9). The stage at which the HSA handling tool 904 is removed from the ramp-HSA assembly 900 may vary from implementation to implementation. For example, the HSA handling tool 904 is useful for sliding the ramp-HSA assembly 900 from the initial position of FIG. 10A to the final position of FIG. 10B (e.g., block 1208 of FIG. 12A), therefore, the HSA handling tool 904 could be removed (at block 1212) at some time after the performance of block 1208. Whether the handling tool 904 is removed from the ramp-HSA assembly 900 before or after the ramp assembly 800 is fixed to the base 1006 (e.g., block 1210 of FIG. 12A) is a matter of choice and may vary from implementation to implementation. However, the handling tool 904 may remain useful when fixing the ramp assembly 800 to the base at block 1210. As discussed, FIG. 11 illustrates the ramp 800 in a final installed position relative to disk stack 522*a* and disk stack 522*b*, and with the HSA handling tool 904 removed.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A multiple disk-stack, shared actuator hard disk drive comprising:
a base;
a first disk media stack rotatably mounted on a first spindle;
a second disk media stack rotatably mounted on a second spindle;
a head slider comprising a read/write head configured to read from and to write to disk media;
a voice coil actuator configured to move said head slider to access portions of at least one disk media of said first disk media stack and at least one disk media of said second disk media stack; and
a ramp positioned between said first disk media stack and said second disk media stack, said ramp comprising:
a first ramp part with which said first disk media stack is interposed, and
a second ramp part with which said second disk media stack is interposed,
wherein said first ramp part and said second ramp part are engaged with one another about a swivel.

2. The hard disk drive of claim 1,
said first ramp part comprising a first wedge shaped feature having a first plane;
said second ramp part comprising a second wedge shaped feature having a second plane; and
wherein said first plane and said second plane mate with one another for aligning said first ramp part with said second ramp part.

3. The hard disk drive of claim 1,
wherein said base comprises a first curved receptacle and a second curved receptacle; and
wherein said first ramp part comprises a first locking pin configured for positioning within said first receptacle and said second ramp part comprises a second locking pin configured for positioning within said second receptacle.

4. The hard disk drive of claim 3,
wherein said first locking pin and said first receptacle are configured for engagement at a first temporary position within said first receptacle and at a first final position within said first receptacle; and
wherein said second locking pin and said second receptacle are configured for engagement at a second temporary position within said second receptacle and at a second final position within said second receptacle.

5. The hard disk drive of claim 1,
wherein said base comprises a swivel pin; and
wherein said first ramp part comprises a first swivel sleeve configured for positioning over said swivel pin and said second ramp part comprises a second swivel sleeve configured for positioning over said swivel pin.

6. The hard disk drive of claim 1,
wherein said base comprises a first platform and a second platform; and
wherein said first ramp part comprises a first mounting feature configured for fastening said first ramp part to said first platform and said second ramp part comprises a second mounting feature configured for fastening said second ramp part to said second platform.

7. The hard disk drive of claim 1,
said base comprising:
a first curved receptacle and a second curved receptacle,
a swivel pin, and
a first platform and a second platform;
said first ramp part comprising:
a first locking pin configured for positioning within said first receptacle,
a first swivel sleeve configured for positioning over said swivel pin, and
a first mounting feature configured for fastening said first ramp part to said first platform; and
said second ramp part comprising:
a second locking pin configured for positioning within said second receptacle,
a second swivel sleeve configured for positioning over said swivel pin, and
a second mounting feature configured for fastening said second ramp part to said second platform.

8. A ramp assembly configured for a multiple disk-stack, shared actuator hard disk drive, the ramp assembly comprising:

a first ramp part positioned, relative to a second ramp part, such that said first ramp part is capable of receiving a head stack assembly from a first direction; and said second ramp part positioned, relative to said first ramp part, such that said second ramp part is capable of receiving said head stack assembly from a second direction opposing said first direction and configured to swivel-engage with said first ramp part.

9. The ramp assembly of claim 8, said first ramp part comprising a first wedge shaped feature;

said second ramp part comprising a second wedge shaped feature; and wherein said first wedge shaped feature and said second wedge shaped feature mate with one another for aligning said first ramp part with said second ramp part.

10. The ramp assembly of claim 8, said first ramp part comprising a first swivel sleeve configured for positioning over a swivel pin; and said second ramp part comprising a second swivel sleeve configured for positioning over said swivel pin.

11. The ramp assembly of claim 8, said first ramp part comprising a first locking pin configured for positioning within a first receptacle; and said second ramp part comprising a second locking pin configured for positioning within a second receptacle.

12. The ramp assembly of claim 8, said first ramp part comprising a first mounting lug configured for coupling said first ramp part with a hard disk drive base; and said second ramp part comprising a second mounting lug configured for coupling said second ramp part with said base.

13. The ramp assembly of claim 8, said first ramp part comprising:

a first swivel sleeve configured for positioning over a swivel pin constituent to a hard disk drive base, a first locking pin configured for positioning within a first receptacle constituent to said base, and a first mounting lug configured for fastening said first ramp part with said base; and said second ramp part comprising:

a second swivel sleeve configured for positioning over said swivel pin, a second locking pin configured for positioning within a second receptacle constituent to said base, and a second mounting lug configured for fastening said second ramp part with said base.

14. A method for installing a ramp into a multiple disk-stack, shared actuator hard disk drive, the method comprising:

positioning a first ramp part in a first initial lock position onto a hard disk drive base;

positioning a second ramp part in a second initial lock position onto said base;

coupling a first disk-stack to said base;

swiveling said first ramp part to a first final lock position and fixing to said base;

installing an actuator assembly onto said base;

parking a head stack assembly of said actuator assembly onto said first ramp part;

coupling a second disk-stack to said base; and swiveling said second ramp part to a second final lock position and fixing to said base.

15. The method of claim 14, further comprising:

removing a head separator from said actuator assembly after parking said actuator assembly onto said first ramp part.

* * * * *